No. 857,451.

PATENTED JUNE 18, 1907.

J. D. EHRLICH & F. F. ESCOFFIER.
SUGAR CANE HARVESTER.
APPLICATION FILED SEPT. 25, 1906.

8 SHEETS—SHEET 5.

No. 857,451. PATENTED JUNE 18, 1907.
J. D. EHRLICH & F. F. ESCOFFIER.
SUGAR CANE HARVESTER.
APPLICATION FILED SEPT. 25, 1906.

8 SHEETS—SHEET 6.

No. 857,451. PATENTED JUNE 18, 1907.
J. D. EHRLICH & F. F. ESCOFFIER.
SUGAR CANE HARVESTER.
APPLICATION FILED SEPT. 25, 1906.
8 SHEETS—SHEET 7.
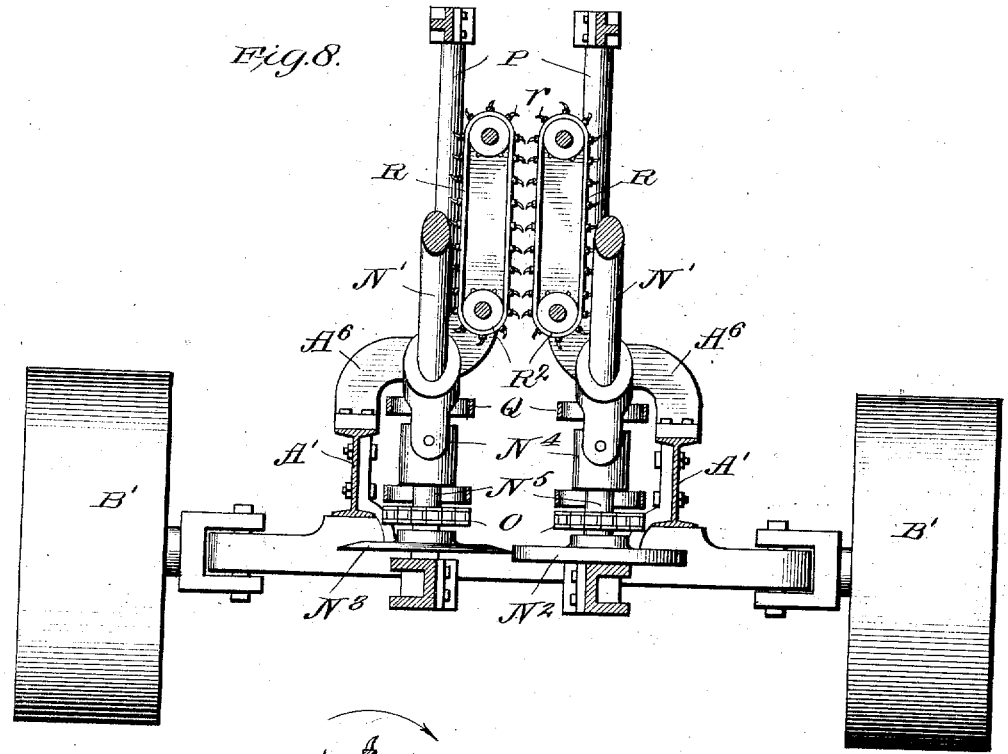
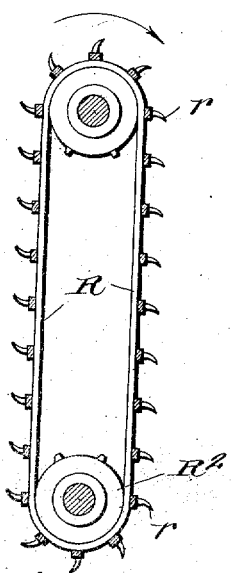
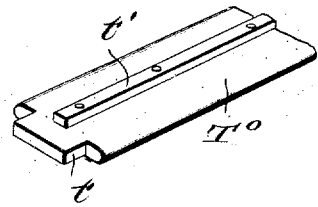

No. 857,451.

PATENTED JUNE 18, 1907.

J. D. EHRLICH & F. F. ESCOFFIER.
SUGAR CANE HARVESTER.
APPLICATION FILED SEPT. 25, 1906.

8 SHEETS—SHEET 8.

Witnesses
Geo. A. Byrne
M. May. Duvall

Inventors
J. D. Ehrlich &
F. F. Escoffier,
by Wilkinson & Fisher
Attorneys.

UNITED STATES PATENT OFFICE.

JOHN D. EHRLICH AND FERNAND F. ESCOFFIER, OF BERWICK, LOUISIANA.

SUGAR-CANE HARVESTER.

No. 857,451.  Specification of Letters Patent.  Patented June 18, 1907.

Application filed September 25, 1906. Serial No. 336,138.

*To all whom it may concern:*

Be it known that we, JOHN D. EHRLICH and FERNAND F. ESCOFFIER, both citizens of the United States, and both residing at Berwick, in the parish of St. Mary and State of Louisiana, have invented certain new and useful Improvements in Sugar-Cane Harvesters; and we do hereby declare the following to be a full, clear, and exact description of the invention, such as will enable others skilled in the art to which it appertains to make and use the same.

Our invention relates to improvements in cane harvesters, and it consists in providing a machine which will direct the divergent cane stalks into a narrow throat, where the canes will be bent over, and will be cut off at the top at substantially the same distance below the head, regardless of the length of the stalk, and close to the ground at the bottom; after which the cane stalks will be "trashed" or stripped of such leaves as may adhere to them, and the stripped stalks will then be fed to a large hopper having carriers leading up its inclined sides, by which the cane may be delivered to either side of the machine as may be preferred, and will fall into carts or other vehicles from the upper part of the moving carriers.

My invention also relates to means for propelling and guiding the vehicle, and for driving the various parts.

My invention will be understood by reference to the accompanying drawings, in which the same parts are indicated by the same letters throughout the several views.

Figure 1:
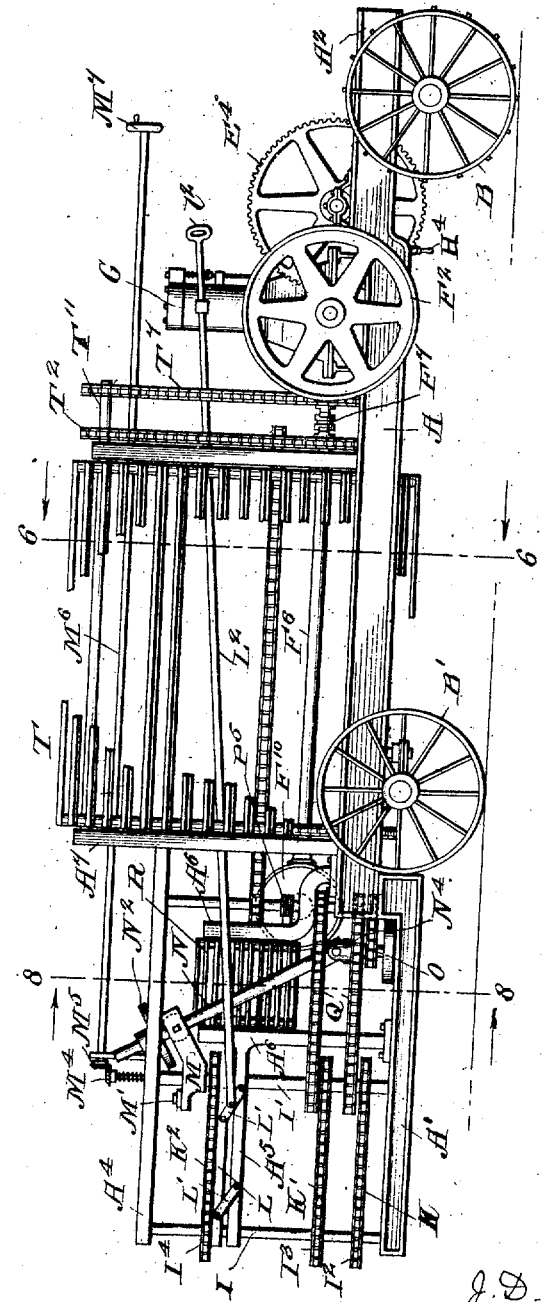
Figure 2:
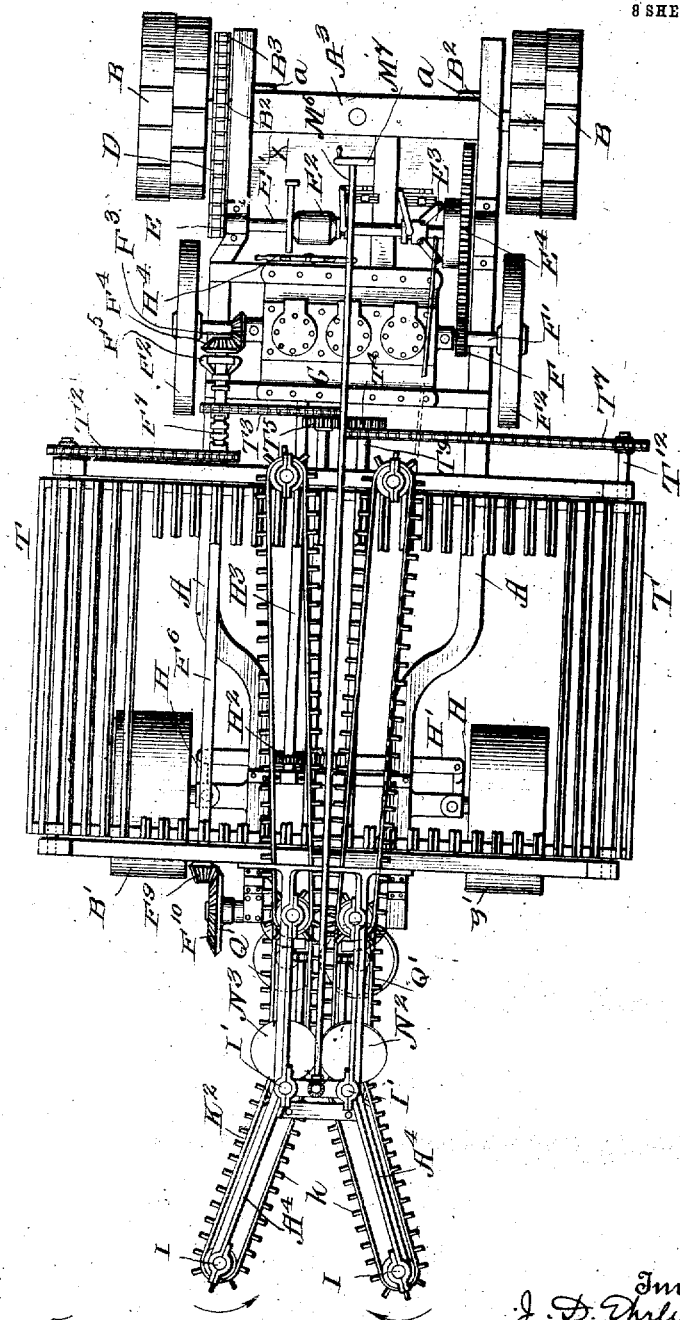
Figure 3:
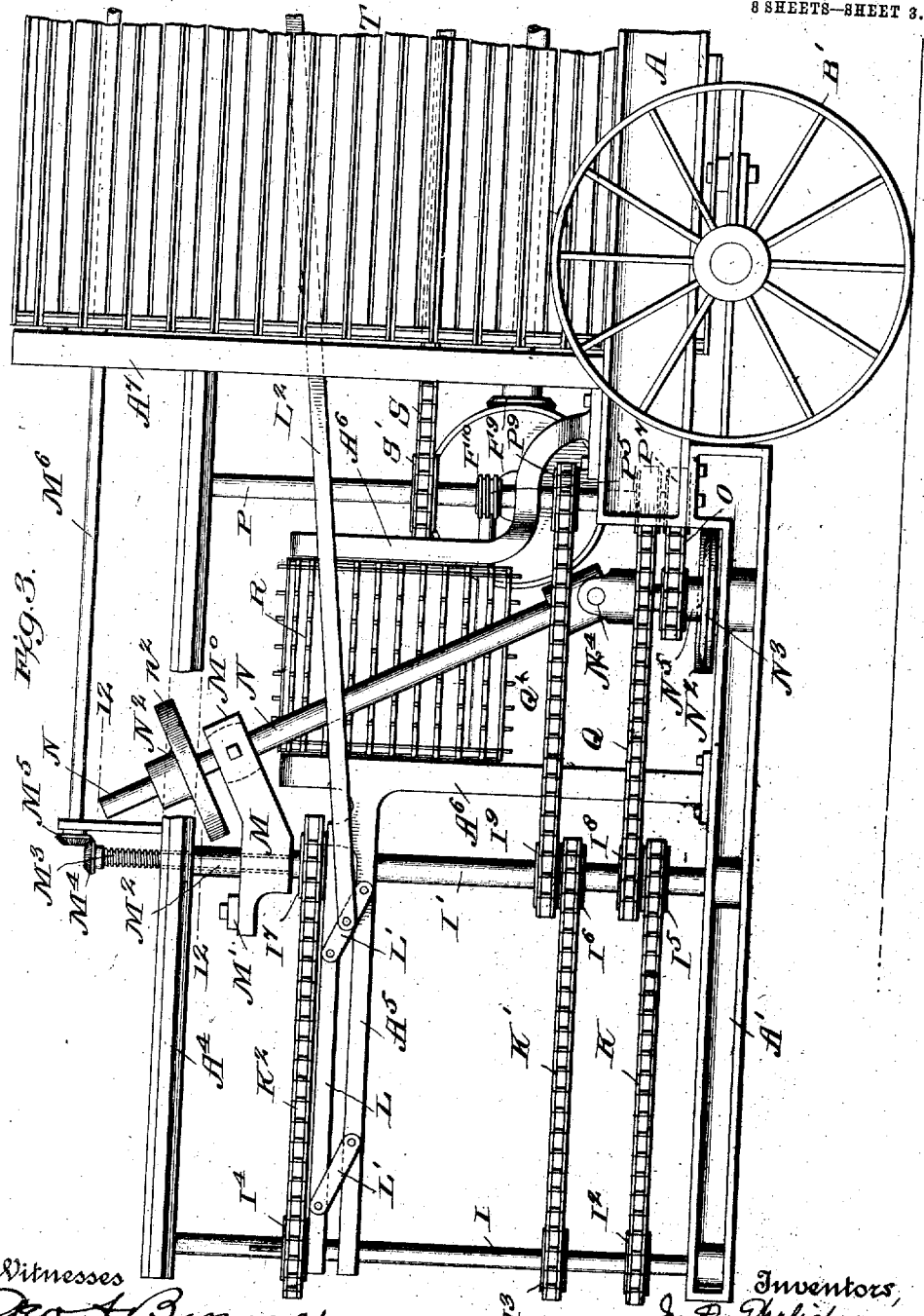
Figure 4:
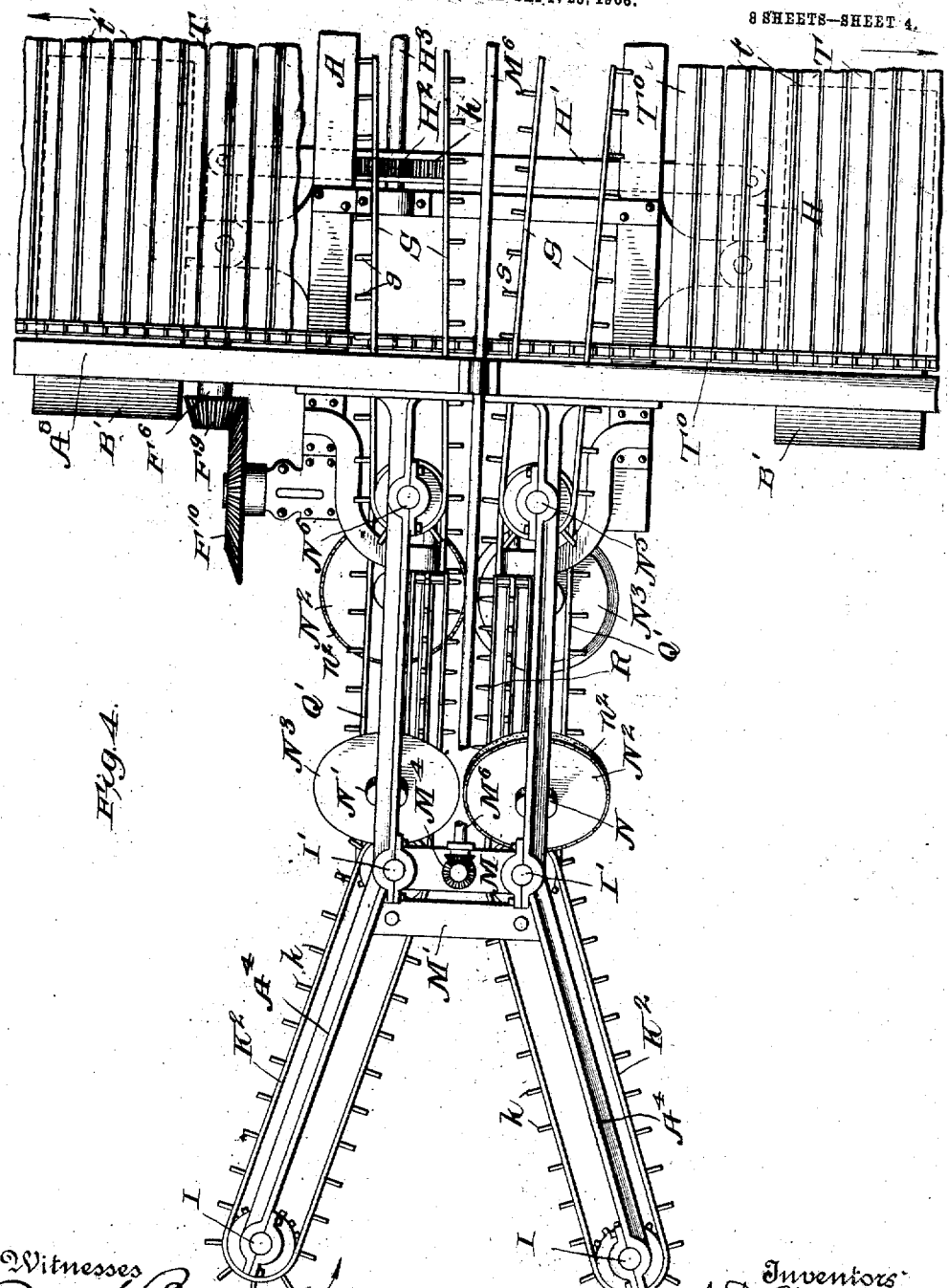
Figure 5:
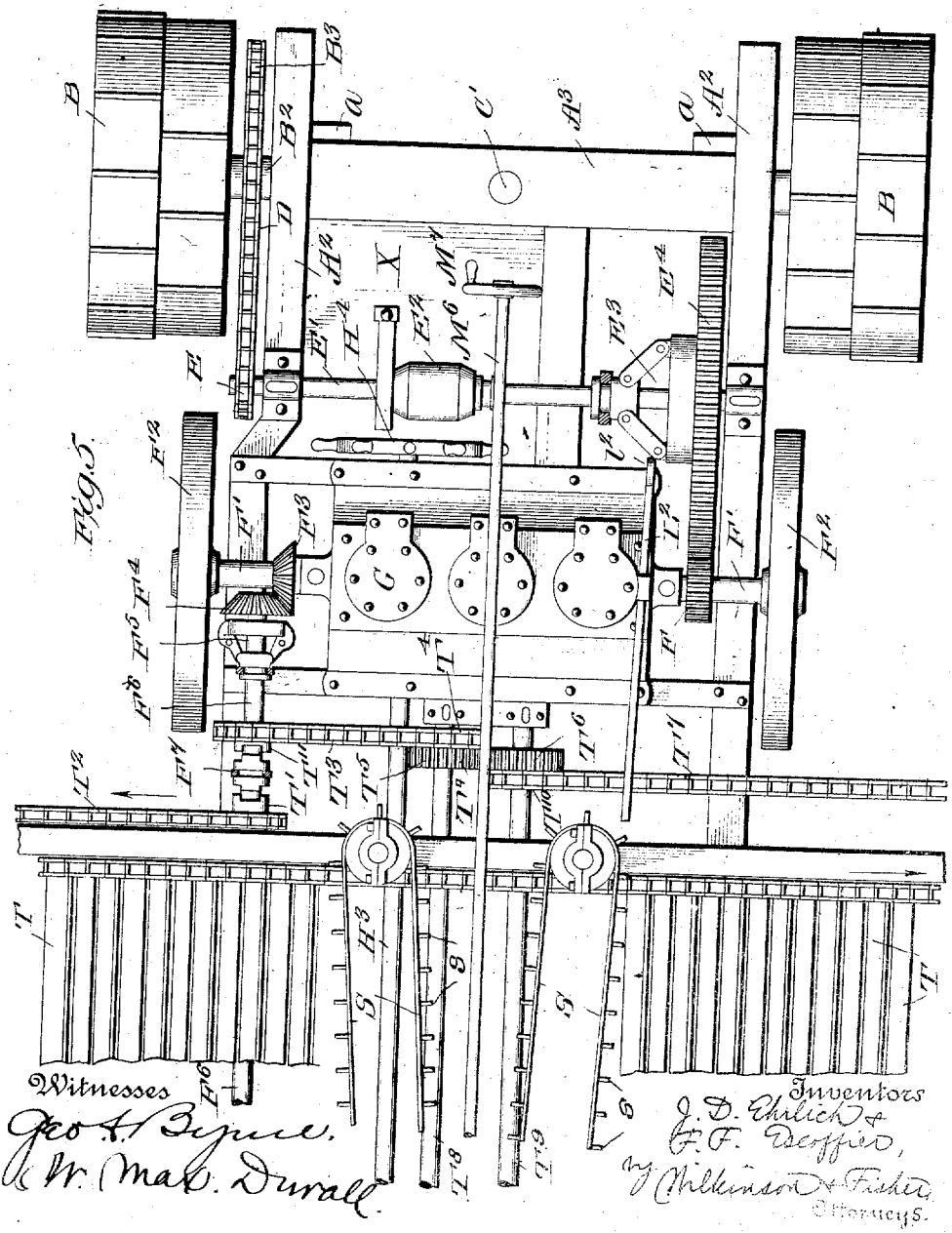
Figure 6:
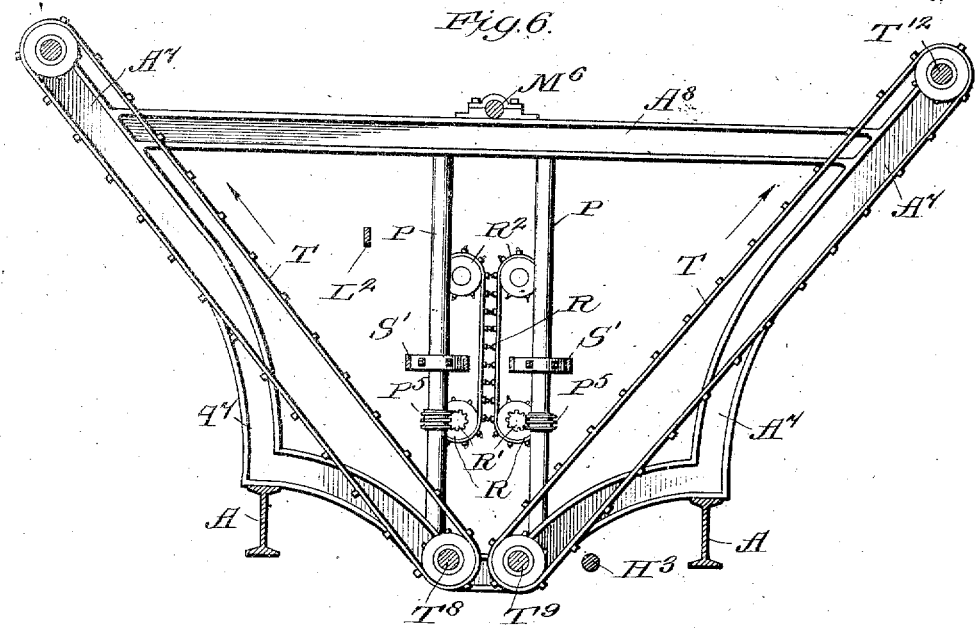
Figure 7:
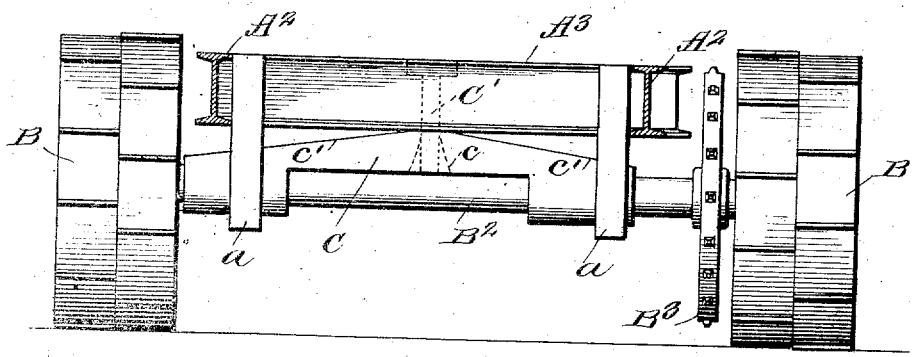
Figure 11:
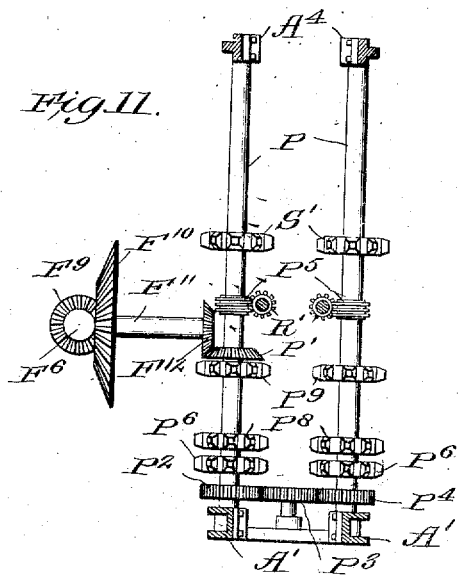
Figure 12:
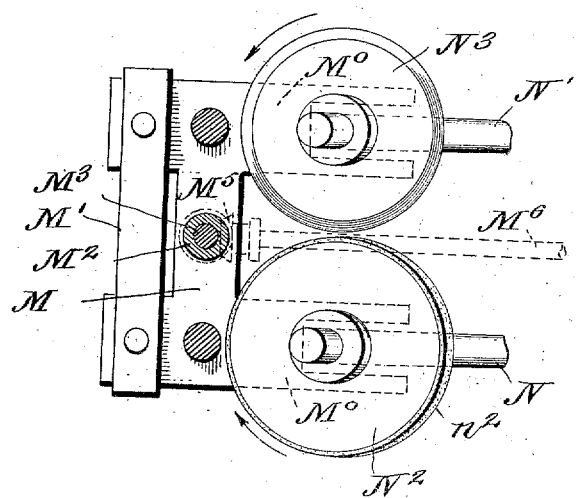

Figure 1 is a side elevation, and Fig. 2 a plan view of the complete harvester, parts of the carrier being broken away and other parts being omitted for the sake of clearness in the drawings. Fig. 3 is a side elevation of the front end of the harvester. Fig. 4 is a plan view of the parts shown in Fig. 3. Fig. 5 is a plan view of the rear end of the harvester, showing the motive power and driving gear. Fig. 6 shows a section along the line 6—6 of Fig. 1 and looking in the direction of the arrows. Fig. 7 is a detail showing the rear truck. Fig. 8 shows a section along the line 8—8 of Fig. 1 and looking in the direction of the arrows. Fig. 9 is a detail, showing the endless band for stripping the cut cane. Fig. 10 is a perspective view of one of the carrier slats used for moving the cane after it has been cut and stripped of trash. Fig. 11 is a detail, showing part of the driving mechanism. Fig. 12 shows a section on the line 12—12 of Fig. 3 and shows the device for cutting the tops off of the cane.

A represents the body or frame of the machine which is provided at its front end with flaring arms A' which form a V-shaped throat into which the divergent stalks of cane are gathered. These arms are mounted low down so as to come close to the ground. The rear end of the frame is preferably elevated as at $A^2$ and carries the cross piece $A^3$.

The harvester is provided with rear traction wheels B and with front wheels B'. The rear wheels B are fast on the shaft $B^2$ carrying the sprocket wheel $B^3$, and this shaft is journaled in a bolster C connected by the king bolt C' to the truck, as shown in Fig. 7.

The top of this bolster is tapered, as at $c'$, to allow a rocking motion to the wheels, due to inequalities of the ground, without disturbing the body of the platform. This bolster C is slotted as at $c$ to permit play of the king pin, and moves in guide straps $a$, all as shown in Fig. 7.

The sprocket wheel $B^3$ is connected by the chain D to the smaller sprocket wheel E (see Figs. 2 and 5), which is carried by the shaft E' having a differential gear $E^2$ of any well known type and a clutch arrangement $E^3$, which latter is also of any well known type. This clutch couples on the spur wheel $E^4$, loosely journaled on the shaft E' and meshing with the pinion F on the shaft F', which shaft carries two fly wheels $F^2$, one at each end. This shaft F' is driven by the engine G which we have shown as of the three cylinder gasolene type.

The shaft F' carries a bevel gear $F^3$ which meshes with the bevel gear $F^4$ which may be connected to the shaft $F^6$ by the clutch $F^5$, which clutch is of any suitable or convenient type. This shaft $F^6$ drives most of the forward mechanism on the harvester, as will be hereinafter more fully described.

The front wheels B' are pivoted on short axles swung by the arms H and the connecting bar H', as is well known in the automobile art. This bar H' carries a rack $h$, see Fig. 4, into which rack meshes the pinion $H^2$ on the shaft $H^3$, which shaft terminates in a steering wheel H⁴, see Figs. 2 and 5. Thus the harvester may be steered from the rear platform X.

Journaled between the beams A' and A⁴ at the front end of the machine are the shafts I and I' which carry the sprocket wheels I² to I⁹, as shown most clearly in Fig. 3. Mounted over three sets of these sprocket wheels are the chains K, K' and K² which carry lugs or pushers $k$, which serve to gather in the cane and force it toward the narrow throat, to be fed to the knives, as will be hereinafter described. These chains move in the direction of the arrows in Figs. 2 and 4. The two chains K and K' take care of the bottom portion of the stalk, while the chain K² takes care of the head of the stalk, and since the stalks may vary in height in going from field to field or row to row, we provide means for raising or lowering the upper chain K², which comprises bars L mounted under the sprocket wheels I⁴ and I⁷, which bars are connected to the frame A⁵ by means of the links L', and these links are operated by the rod L² and handle $l^2$ from the platform X. There should preferably be two of these rods L², one at each side of the machine, but only one is shown for the sake of clearness in the drawings. Any other suitable means for raising or lowering the upper chain may be adopted, if desired.

Spanning the two rods I' is a frame M which carries a cross piece M' which strikes the heads of the cane and tilts the heads forward, causing these heads to bend underneath said cross piece until the resiliency of the cane stalk is sufficient to swing the head with the leaves etc. attached beneath this cross piece M', when the head will swing into engagement with the head cutter, as will be hereinafter described. In this way the canes automatically adjust themselves to the head cutter so that substantially the same length is cut off from the top of each cane. This is especially desirable, as the length of the green portion of each cane is substantially the same, regardless of the height of the stalk. This frame M carries two rearwardly projecting arms M⁰, in which arms the shafts N and N' are journaled so as to rotate not only in said bearings, but also to rock therein as the frame M is raised or lowered. This frame M is connected to a nut M² in which the screw M³ engages. This screw is turned by the bevel gears M⁴ and M⁵, the shaft M⁶, and the hand wheel M⁷, so that the frame M may be raised or lowered from the platform X. It is desirable to raise or lower this frame, according to the height of the cane stalks.

The shafts N and N' are connected by universal joints N to the short shafts N⁵ journaled at the base of the machine. These short shafts N⁵ carry respectively a circular cutting blade N³ and a disk N², which is preferably faced with heavy leather $n^2$, but if desired two over-lapping circular cutting or corrugated blades may be used, instead of a disk and a blade.

It will be seen that the shafts N and N' carry a similar disk N² and cutting blade N³ respectively, and that the shafts N and N' are inclined forward so that the bottom of the stalks will only be reached after the top is cut and the leaves stripped off. This head cutter will cut off the top of the stalk with most of the green leaves, and the remaining leaves will be removed by the stripping band R which is provided with hook shaped teeth $r$, as shown in Fig. 9. These teeth are staggered on the opposite bands, as shown in Fig. 4, and tear off any leaves that may adhere to the cane stalks, depositing same on the ground. It will be seen that the tops of the cane and also the trash will be deposited over the stubble, which is especially desirable to protect the stubble in cold weather.

The endless bands R mounted between the frame pieces A⁶ are driven in any convenient way, as will be hereinafter described.

Two chains S provided with pushers $s$ drag the cane stalks from the forward part of the machine into the V-shaped hopper whose bottom consists of two endless carriers T having slats T⁰, as shown in Fig. 10, with metal ribs $t'$ on said slats to prevent the cane from slipping on the carrier. These slats are provided with tenons $t$ which engage in the carrier chains, as is well known in the art. These slats are close enough together to prevent the cane from dropping through or projecting into the spaces between the slats.

The two drag chains S diverge toward the rear of the hopper so that the cane may be distributed throughout the length of the hopper.

The carriers T are mounted in brackets A⁷ connected together by the beam A⁸, as shown in Fig. 6, and the tops of the sides of the hopper are made high enough for an ordinary cart or wagon to drive beneath the over-hang and to receive the cane directly from the hopper. These carriers T may be driven independently, one at a time, or both together, as may be desired and as will be hereinafter described.

Referring to Figs. 2 to 5, F⁶ represents a shaft which may be coupled to the shaft F' by the bevel gears F³ F⁴ and the clutch F⁵, as already described. F⁷ is splined on the shaft F⁶ which is adapted to engage one or the other of the sprocket wheels T' and T¹¹. The shaft F⁶ is connected by the sprocket chain T³ to the sprocket wheel T⁴ which is mounted on a shaft T⁸. This shaft T⁸ carries the gear wheel T⁵ which meshes in the gear wheel T⁶ on the shaft T⁹, and the shaft T⁹ carries a sprocket wheel T¹⁰ which drives the sprocket chain T⁷, driving the shaft T¹² carrying one of the upper drums of the carrier. The opposite upper drum is driven by the sprocket wheel T′ and the sprocket chain T². The sprocket wheels T′ and T¹¹ are loose on the shaft F⁶ and the clutch F⁷ is splined on said shaft, and by throwing this clutch into engagement with one or the other of these sprocket wheels, one or the other of the carriers T will be driven, while if the clutch is in the mid or off position, neither of these carriers will be moved. In this way the cart may be loaded at either side of the harvester.

The mechanism at the front end of the machine is driven in any suitable way, such for instance as is shown in Figs. 3, 4, 6, and 11. The shaft F⁶ carries a bevel pinion F⁹ meshing with the bevel gear F¹⁰ carried on the shaft F¹¹, which in turn is provided with a bevel gear F¹² meshing with the bevel gear P′ on one of the shafts P, see Fig. 11. These shafts P are provided with a series of sprocket wheels S′, and P⁶ to P⁹. The two shafts are geared together to turn in the same direction, by means of the gears P² and P⁴ and the idler P³. The stripper bands R are driven by the worms P⁵ and the worm wheels R′, as shown in Figs. 3, 6, and 11.

It will be seen that all of the operating mechanism in the forward part of the machine is thrown out of operation by the clutch F⁵ and that by throwing the clutch F⁷ out, one or the other of the carriers T may be put into operation, or both may be thrown out of operation, as may be desired.

The operation of the device is as follows:— The machine is steered until the wheels straddle the row to be cut and is then driven ahead; at the same time the mechanism at the front end of the machine is put in operation in the direction of the arrows, by throwing the clutch F⁵. This will cause the gathering chains K, K′ and K² at the front end of the machine to draw the cane into the V-shaped throat, and the top of the stalks will strike the cross beam M′ and will be bent down, while the bottom ends of the stalks will approach the lower cutter. After the resiliency of the head of the stalk has allowed it to swing into the top cutter the cane is forced between the stripping bands R by the chains Q and Q′ and being stripped of its leaves is then cut at the bottom and delivered to the hopper by drag chains S. The divergence of these chains will allow the stalks to fall into the bottom of the hopper throughout the length thereof and the cane will be carried over one side or the other of the hopper by means of the carriers T.

To vary the height at which the cane is cut, the frame M is raised or lowered by means of the mechanism driven by the hand wheel M⁷, and to adjust the engagement of the chain K² for long or short canes, the bars L may be lifted by means of the rods L². There should be one of these rods L² and handles l² on each side of the machine, as before stated, but only one is shown, for the sake of clearness in the drawings.

It will be seen that when the frame M is raised, it will not only raise the cross piece M′, but it will also cause the members N and N′ of the head shafts to swing upward, thus elevating the head cutter.

It will be noted that all of the parts of the machine, as well as the guiding of the same, may be controlled from the platorm X.

It will thus be seen that the forward end of the machine will project down between the rows of cane, will gather the cane into a V-shaped throat, will feed it to the cutters automatically, regulating the length of the top to be cut off, will strip the stalks when cut, will deliver the stalks when cut and stripped to a hopper, and will feed the stalks over either side of the said hopper to a suitable cart or wagon, not shown.

It will be obvious that in an apparatus comprising so many features, various modifications might be made in many of the parts which could be used without departing from the spirit of the invention. Thus we do not mean to limit ourselves to the specific driving means for driving the various parts or for driving the carriers, or the specific arrangement of the truck body, but

What we claim and desire to secure by Letters Patent of the United States is:—

1. A cane harvester comprising a movable vehicle body with means for propelling same, means for gathering the divergent canes into a narrow passage, a cutter located near the ground for cutting the bottoms of the canes, a cutter spaced above the first cutter and adapted to cut the top off the canes, means dependent upon the resiliency of the canes for automatically presenting a substantially uniform length of top to be cut off, means for stripping the trash from the cut stalks, a V-shaped hopper having the sides formed of inclined carriers, and means for carrying the cane from the cutters to said hopper, substantially as described.

2. A cane harvester comprising a movable vehicle body with means for propelling same, a series of moving chains provided with pusher lugs forming a V-shaped throat at the forward end of the machine for gathering the divergent canes into a narrow passage, a cutter located near the ground for cutting the bottoms of the canes, a cutter spaced above the first cutter and adapted to cut the top off the canes, means dependent upon the resiliency of the canes for automatically presenting a substantially uniform length of top to be cut off, means for stripping the trash from the cut stalks, a V shaped hopper having sides formed of inclined carriers, and means for carrying the cane from the cutters to said hopper, substantially as described.

3. A cane harvester comprising a movable vehicle body with means for propelling same, means for gathering and holding the divergent canes in a substantially vertical plane prior to reaching the cutters, a cutter located near the ground for cutting the bottoms of the canes, a cutter spaced above the first cutter and adapted to cut the top off the canes, means dependent upon the resiliency of the canes for automatically presenting a substantially uniform length of top to be cut off, and means for carrying the cane from the cutters to a suitable receptacle, substantially as described.

4. A cane harvester comprising a movable vehicle body with means for propelling same, a series of moving chains provided with pusher lugs forming a V-shaped throat at the forward end of the machine for gathering the divergent canes into a narrow passage, a cutter located near the ground for cutting the bottoms of the canes, a cutter spaced above the first cutter and adapted to cut the top off the canes, means dependent upon the resiliency of the canes for automatically presenting a substantially uniform length of top to be cut off, and means for carrying the cane from the cutters to a suitable receptacle, substantially as described.

5. A cane harvester comprising a movable vehicle body with means for propelling same, means for gathering and holding the divergent canes in a substantially vertical plane prior to reaching the cutters, a rotary cutter located near the ground for cutting the bottoms of the canes, a rotary cutter spaced above the first cutter and adapted to cut the top off the canes, means dependent upon the resiliency of the canes for automatically presenting a substantially uniform length of top to be cut off, and means for carrying the cane from the cutters to a suitable receptacle, substantially as described.

6. A cane harvester comprising a movable vehicle body with means for propelling same, a series of moving chains provided with pusher lugs forming a V-shaped throat at the forward end of the machine for gathering the divergent canes into a narrow passage, a rotary cutter located near the ground for cutting the bottoms of the canes, a rotary cutter spaced above the first cutter and adapted to cut the top off the canes, means dependent upon the resiliency of the canes for automatically presenting a substantially uniform length of top to be cut off, and means for carrying the cane from the cutters to a suitable receptacle, substantially as described.

7. A cane harvester comprising a movable vehicle body with means for propelling same, means for gathering and holding the divergent canes in a substantially vertical plane prior to reaching the cutters, a rotary cutter located near the ground for cutting the bottoms of the canes, a rotary cutter spaced above the first cutter and adapted to cut the top off the canes, means for raising or lowering the upper cutter, means dependent upon the resiliency of the canes for automatically presenting a substantially uniform length of top to be cut off, and means for carrying the cane from the cutters to a suitable receptacle, substantially as described.

8. A cane harvester comprising a movable vehicle body with means for propelling same, a series of moving chains provided with pusher lugs forming a V-shaped throat at the forward end of the machine for gathering the divergent canes into a narrow passage, a cutter located near the ground for cutting the bottoms of the canes, a cutter spaced above the first cutter and adapted to cut the top off the canes, means for raising or lowering the upper cutter, means dependent upon the resiliency of the canes for automatically presenting a substantially uniform length of top to be cut off, and means for carrying the cane from the cutters to a suitable receptacle, substantially as described.

9. A cane harvester comprising a movable vehicle body with means for propelling same, means for gathering the divergent canes into a narrow passage, a cutter located near the ground for cutting the bottoms of the canes, a cutter spaced above the first cutter and adapted to cut the top off the canes, a cross bar located in front of and below the upper cutter and adapted to bend over the heads of the canes, allowing same to spring up to the upper cutter, means for stripping the trash from the cut stalks, a V-shaped hopper having the sides formed of inclined carriers, and means for carrying the cane from the cutters to said hopper, substantially as described.

10. A cane harvester comprising a movable vehicle body with means for propelling same, a series of moving chains provided with pusher lugs forming a V-shaped throat at the forward end of the machine for gathering the divergent canes into a narrow passage, a cutter located near the ground for cutting the bottoms of the canes, a cutter spaced above the first cutter and adapted to cut the top off the canes, a cross bar located in front of and below the upper cutter and adapted to bend over the heads of the canes allowing same to spring up to the upper cutter, means for stripping the trash from the cut stalks, a V-shaped hopper having the sides formed of inclined carriers, and means for carrying the cane from the cutters to said hopper, substantially as described.

11. A cane harvester comprising a movable vehicle body with means for propelling same, means for gathering the divergent canes into a narrow passage, a cutter located near the ground for cutting the bottoms of the canes, a cutter spaced above the first cutter and adapted to cut the top off the canes, a cross bar located in front of and below the upper cutter and adapted to bend over the heads of the canes allowing same to spring up to the upper cutter, means for varying the height both of said cross bar and of said upper cutter, means for stripping the trash from the cut stalks, a V-shaped hopper having the sides formed of inclined carriers, and means for carrying the cane from the cutters to said hopper, substantially as described.

12. A cane harvester comprising a movable vehicle body with means for propelling same, a series of moving chains provided with pusher lugs forming a V-shaped throat at the forward end of the machine for gathering the divergent canes into a narrow passage, a cutter located near the ground for cutting the bottoms of the canes, a cutter spaced above the first cutter and adapted to cut the top off the canes, a cross bar located in front of and below the upper cutter and adapted to bend over the heads of the canes allowing same to spring up to the upper cutter, means for varying the height of said cross bar and of said upper cutter, means for stripping the trash from the cut stalks, a V-shaped hopper having the sides formed of inclined carriers, and means for carrying the cane from the cutters to said hopper, substantially as described.

13. A cane harvester comprising a movable vehicle body with means for propelling same, means for gathering and holding the divergent canes in a substantially vertical plane prior to reaching the cutters, a cutter located near the ground for cutting the bottoms of the canes, a cutter spaced above the first cutter and adapted to cut the top off the canes, means dependent upon the resiliency of the canes for automatically presenting a substantially uniform length of top to be cut off, means for carrying the cane from the cutters to a suitable receptacle, and means for stripping the trash from the cut canes while in transit between the cutters and the receptacle, substantially as described.

14. A cane harvester comprising a movable vehicle body with means for propelling same, a series of moving chains provided with pusher lugs forming a V-shaped throat at the forward end of the machine for gathering the divergent canes into a narrow passage, a cutter located near the ground for cutting the bottoms of the canes, a cutter spaced above the first cutter and adapted to cut the top off the canes, means dependent upon the resiliency of the canes for automatically presenting a substantially uniform length of top to be cut off, means for carrying the cane from the cutters to a suitable receptacle, and means for stripping the trash from the cut canes while in transit between the cutters and the receptacle, substantially as described.

15. A cane harvester comprising a movable vehicle body with means for propelling same, means for gathering and holding the divergent canes in a substantially vertical plane prior to reaching the cutters, a rotary cutter located near the ground for cutting the bottoms of the canes, a rotary cutter spaced above the first cutter and adapted to cut the top off the canes, means dependent upon the resiliency of the canes for automatically presenting a substantially uniform length of top to be cut off, means for carrying the cane from the cutters to a suitable receptacle, and means for stripping the trash from the cut canes while in transit between the cutters and the receptacle, substantially as described.

16. A cane harvester comprising a movable vehicle body with means for propelling same, a series of moving chains provided with pusher lugs forming a V-shaped throat at the forward end of the machine for gathering the divergent canes into a narrow passage, a rotary cutter located near the ground for cutting the bottoms of the canes, a rotary cutter spaced above the first cutter and adapted to cut the top off the canes, means dependent upon the resiliency of the canes for automatically presenting a substantially uniform length of top to be cut off, means for carrying the cane from the cutters to a suitable receptacle, and means for stripping the trash from the cut canes while in transit between the cutters and the receptacle, substantially as described.

17. A cane harvester comprising a movable vehicle body with means for propelling same, means for gathering and holding the divergent canes in a substantially vertical plane prior to reaching the cutters, a rotary cutter located near the ground for cutting the bottoms of the canes, a rotary cutter spaced above the first cutter and adapted to cut the top off the canes, means for raising or lowering the upper cutter, means dependent upon the resiliency of the canes for automatically presenting a substantially uniform length of top to be cut off, means for carrying the cane from the cutters to a suitable receptacle, and means for stripping the trash from the cut canes while in transit between the cutters and the receptacle, substantially as described.

18. A cane harvester comprising a movable vehicle body with means for propelling same, a series of moving chains provided with pusher lugs forming a V-shaped throat at the forward end of the machine for gathering the divergent canes into a narrow passage, a cutter located near the ground for cutting the bottoms of the canes, a cutter spaced above the first cutter and adapted to cut the top off the canes, means for raising or lowering the upper cutter, means dependent upon the resiliency of the canes for automatically presenting a substantially uniform length of top to be cut off, means for carrying the cane from the cutters to a suitable receptacle, and means for stripping the trash from the cut canes while in transit between the cutters and the receptacle, substantially as described.

19. A cane harvester comprising a movable vehicle body with means for propelling same, means for gathering the divergent canes into a narrow passage, a cutter located near the ground for cutting the bottom of the canes, a cutter spaced above the first cutter and adapted to cut the top off the canes, a cross bar located in front of and below the upper cutter and adapted to bend over the heads of the canes, allowing same to spring up to the upper cutter, means for stripping the trash from the cut stalks, a V-shaped hopper having the sides formed of inclined carriers, means for carrying the cane from the cutters to said hopper, and means for stripping the trash from the cut canes while in transit between the cutters and the hopper, substantially as described.

20. A cane harvester comprising a movable vehicle body with means for propelling same, a series of moving chains provided with pusher lugs forming a V-shaped throat at the forward end of the machine for gathering the divergent canes into a narrow passage, a cutter located near the ground for cutting the bottoms of the canes, a cutter spaced above the first cutter and adapted to cut the top off the canes, a cross bar located in front of and below the upper cutter and adapted to bend over the heads of the canes allowing same to spring up to the upper cutter, toothed stripper bands for stripping the trash from the cut stalks, a V-shaped hopper having the sides formed of inclined carriers, and means for carrying the cane from the cutters to said hopper between the cutters and the hopper, substantially as described.

21. A cane harvester comprising a movable vehicle body with means for propelling same, means for gathering and holding the divergent canes in a substantially vertical plane prior to reaching the cutters, a cutter located near the ground for cutting the bottoms of the canes, a cutter spaced above the first cutter and adapted to cut the top off the canes, means dependent upon the resiliency of the canes for automatically presenting a substantially uniform length of top to be cut off, means for carrying the cane from the cutters to a suitable receptacle, and toothed stripper bands removing the trash from the cut cane while in transit between the cutters and the receptacle, substantially as described.

22. A cane harvester comprising a movable vehicle body with means for propelling same, a series of moving chains provided with pusher lugs forming a V-shaped throat at the forward end of the machine for gathering the divergent canes into a narrow passage, a cutter located near the ground for cutting the bottoms of the canes, a cutter spaced above the first cutter and adapted to cut the top off the canes, means dependent upon the resiliency of the canes for automatically presenting a substantially uniform length of top to be cut off, means for carrying the cane from the cutters to a suitable receptacle, and toothed stripper bands removing the trash from the cut cane while in transit between the cutters and the receptacle, substantially as described.

23. A cane harvester comprising a movable vehicle body with means for propelling same, means for gathering and holding the divergent canes in a substantially vertical plane prior to reaching the cutters, a rotary cutter located near the ground for cutting the bottoms of the canes, a rotary cutter spaced above the first cutter and adapted to cut the top off the canes, means dependent upon the resiliency of the canes for automatically presenting a substantially uniform length of top to be cut off, means for carrying the cane from the cutters to a suitable receptacle, and toothed stripper bands removing the trash from the cut cane while in transit between the cutters and the receptacle, substantially as described.

24. A cane harvester comprising a movable vehicle body with means for propelling same, a series of moving chains provided with pusher lugs forming a V-shaped throat at the forward end of the machine for gathering the divergent canes into a narrow passage, a rotary cutter located near the ground for cutting the bottoms of the canes, a rotary cutter spaced above the first cutter and adapted to cut the top off the canes, means dependent upon the resiliency of the canes for automatically presenting a substantially uniform length of top to be cut off, means for carrying the cane from the cutters to a suitable receptacle, and toothed stripper bands removing the trash from the cut cane while in transit between the cutters and the receptacle, substantially as described.

25. A cane harvester comprising a movable vehicle body with means for propelling same, means for gathering and holding the divergent canes in a substantially vertical plane prior to reaching the cutters, a rotary cutter located near the ground for cutting the bottoms of the canes, a rotary cutter spaced above the first cutter and adapted to cut the top off the canes, means for raising or lowering the upper cutter, means dependent upon the resiliency of the canes for automatically presenting a substantially uniform length of top to be cut off, means for carrying the cane from the cutters to a suitable receptacle, and toothed stripper bands removing the trash from the cut cane while in transit between the cutters and the receptacle, substantially as described.

26. A cane harvester comprising a movable vehicle body with means for propelling same, a series of moving chains provided with pusher lugs forming a V-shaped throat at the forward end of the machine for gathering the divergent canes into a narrow passage, a cutter located near the ground for cutting the bottoms of the canes, a cutter spaced above the first cutter and adapted to cut the top off the canes, means for raising or lowering the upper cutter, means dependent upon the resiliency of the canes for automatically presenting a substantially uniform length of top to be cut off, means for carrying the cane from the cutters to a suitable receptacle, and toothed stripper bands removing the trash from the cut cane while in transit between the cutters and the receptacle, substantially as described.

27. A cane harvester comprising a movable vehicle body with means for propelling same, means for gathering the divergent canes into a narrow passage, a cutter located near the ground for cutting the bottoms of the canes, a cutter spaced above the first cutter and adapted to cut the top off the canes, a cross bar located in front of and below the upper cutter and adapted to bend over the heads of the canes, allowing same to spring up to the upper cutter, means for stripping the trash from the cut stalks, a V-shaped hopper having the sides formed of inclined carriers, means for carrying the cane from the cutters to said hopper, and toothed stripper bands removing the trash from the cut cane while in transit between the cutters and the hopper, substantially as described.

28. A cane harvester comprising a movable vehicle body with means for propelling same, a series of moving chains provided with pusher lugs forming a V-shaped throat at the forward end of the machine for gathering the divergent canes into a narrow passage, a cutter located near the ground for cutting the bottoms of the canes, a cutter spaced above the first cutter and adapted to cut the top off the canes, a cross bar located in front of and below the upper cutter and adapted to bend over the heads of the canes allowing same to spring up to the upper cutter, means for stripping the trash from the cut stalks, a V-shaped hopper having the sides formed of inclined carriers, means for carrying the cane from the cutters to said hopper, and toothed stripper bands removing the trash from the cut cane while in transit between the cutters and the hopper, substantially as described.

29. A cane harvester comprising a movable vehicle body with means for propelling same, means for gathering the divergent canes into a narrow passage, a rotary cutter comprising a circular knife and a disk contiguous thereto, located in said passage and near the ground for cutting the bottoms of the canes, a similar cutter spaced above and forward of the first cutter and adapted to cut the top off the canes, a cross bar located in front of and below the upper cutter and adapted to bend over the heads of the canes allowing same to spring up to the upper cutter, means for varying the height both of said cross bar and of said upper cutter, a V-shaped hopper having the sides formed of inclined carriers, and means for carrying the cane from the cutters to said hopper between the cutters and the hopper, substantially as described.

30. A cane harvester comprising a movable vehicle body with means for propelling same, a series of moving chains provided with pusher lugs forming a V-shaped throat at the forward end of the machine for gathering the divergent canes into a narrow passage, a cutter located near the ground for cutting the bottoms of the canes, a cutter spaced above the first cutter and adapted to cut the top off the canes, a cross bar located in front of and below the upper cutter and adapted to bend over the heads of the canes allowing same to spring up to the upper cutter, means for varying the height of said cross bar and of said upper cutter, a V-shaped hopper having the sides formed of inclined carriers, and means for carrying the cane from the cutters to said hopper between the cutters and the hopper, substantially as described.

31. A cane harvester comprising a movable vehicle body with means for propelling same, means for gathering and holding the divergent canes in a substantially vertical plane prior to reaching the cutters, a rotary cutter comprising a circular knife and a disk contiguous thereto, located in said passage and near the ground for cutting the bottoms of the canes, a similar cutter spaced above and forward of the first cutter and adapted to cut the top off the canes, a cross bar located in front of and below the upper cutter and adapted to bend over the heads of the canes allowing same to spring up to the upper cutter, means for carrying the cane from the cutters to a suitable receptacle, and means for stripping the trash from the cut canes while in transit between the cutters and the receptacle, substantially as described.

32. A cane harvester comprising a movable vehicle body with means for propelling same, means for gathering and holding the divergent canes in a substantially vertical plane prior to reaching the cutters, a rotary cutter comprising a circular knife and a disk contiguous thereto, located in said passage and near the ground for cutting the bottoms of the canes, a similar cutter spaced above and forward of the first cutter and adapted to cut the top off the canes, a cross bar located in front of and below the upper cutter and adapted to bend over the heads of the canes allowing same to spring up to the upper cutter, means for carrying the cane from the cutters to a suitable receptacle, and means for stripping the trash from the cut canes while in transit between the cutters and the receptacle, substantially as described.

33. A cane harvester comprising a movable vehicle body with means for propelling same, means for gathering the divergent canes into a narrow passage, a cutter located in said passage and near the ground for cutting the bottom of the canes, a cutter spaced above and in front of the first cutter and adapted to cut the top off the canes, a cross bar located in front of and below the upper cutter and adapted to bend over the heads of the canes, allowing same to spring up to the upper cutter, means for stripping the trash from the cut stalks, a V-shaped hopper having the sides formed of inclined carriers, means for moving either of said carriers, and means for carrying the cane from the cutters to said hopper between the cutters and the hopper, substantially as described.

34. A cane harvester comprising a movable vehicle body with means for propelling same, means for gathering and holding the divergent canes in a substantially vertical plane prior to reaching the cutters, a cutter located in said passage and near the ground for cutting the bottoms of the canes, a cutter spaced above and in front of the first cutter and adapted to cut the top off the canes, means for automatically presenting a substantially uniform length of top to be cut off, means for carrying the cane from the cutters to a suitable receptacle, and toothed stripper bands removing the trash from the cut cane while in transit between the cutters and the receptacle, substantially as described.

35. A cane harvester comprising a movable vehicle body with means for propelling same, a series of moving chains provided with pusher lugs forming a V-shaped throat at the forward end of the machine for gathering the divergent canes into a narrow passage, a cutter located in said passage and near the ground for cutting the bottoms of the canes, a cutter spaced above and in front of the first cutter and adapted to cut the top off the canes, means for automatically presenting a substantially uniform length of top to be cut off, means for carrying the cane from the cutters to a suitable receptacle, and means removing the trash from the cut cane while in transit between the cutters and the receptacle, substantially as described.

36. A cane harvester comprising a movable vehicle body with means for propelling same, a series of moving chains provided with pusher lugs forming a V-shaped throat at the forward end of the machine for gathering the divergent canes into a narrow passage, a rotary cutter located in said passage and near the ground for cutting the bottoms of the canes, a rotary cutter spaced above the first cutter and adapted to cut the top off the canes, means for automatically presenting a substantially uniform length of top to be cut off, means for carrying the cane from the cutters to a suitable receptacle, and means for removing the trash from the cut cane while in transit between the cutters and the receptacle, substantially as described.

In testimony whereof, we affix our signatures, in presence of two witnesses.

JOHN D. EHRLICH.
FERNAND F. ESCOFFIER.

Witnesses:
BURL CLEMENT,
FRED F. CHAPMAN.